United States Patent [19]
Spock

[11] Patent Number: 5,903,550
[45] Date of Patent: May 11, 1999

[54] METHOD AND SYSTEM FOR PARALLEL DEMODULATION OF MULTIPLE CHIPS OF A CDMA SIGNAL

[75] Inventor: Gregory Peter Spock, Fort Worth, Tex.

[73] Assignee: Motorola, Inc., Schaumburg, Ill.

[21] Appl. No.: 08/778,430

[22] Filed: Jan. 2, 1997

[51] Int. Cl.⁶ .................................................. H04B 7/216
[52] U.S. Cl. ........................... 370/335; 370/342; 375/200
[58] Field of Search ............................ 375/200, 347–349, 375/206; 370/320, 335, 342, 209

[56] References Cited

U.S. PATENT DOCUMENTS

| | | | |
|---|---|---|---|
| 5,151,919 | 9/1992 | Dent | 375/200 |
| 5,237,586 | 8/1993 | Bottomley | 370/342 |
| 5,305,349 | 4/1994 | Dent | 370/342 |
| 5,544,156 | 8/1996 | Teder et al. | 370/342 |

*Primary Examiner*—Chau Nguyen
*Attorney, Agent, or Firm*—L. Bruce Terry

[57] ABSTRACT

In a code division multiple access (CDMA) signal demodulator in a communication system (50), samples of a CDMA signal are stored in a sample buffer (52). A plurality of the samples that represent a plurality of chips of a symbol are then recalled from the sample buffer (52). Thereafter, the plurality of samples are demodulated in parallel (56) using a selected user code (68) to produce at least a portion of a user's symbol in the code division multiple access signal. Signals from multiple users (22, 24) having multiple fingers are demodulated by sharing the resources of a parallel demodulator (56). Signal searching may use the same parallel demodulator (56). Fingers for multiple users may be dynamically allocated and reallocated according to the needs of each user's signal and the total demodulation resources available.

24 Claims, 7 Drawing Sheets

*PRIOR ART*

METHOD AND SYSTEM FOR PARALLEL DEMODULATION OF MULTIPLE CHIPS OF A CDMA SIGNAL

FIELD OF THE INVENTION

The present invention is related in general to digital communication systems, and more particularly to an improved method and system for simultaneously demodulating multiple chips of a code division multiple access (CDMA) signal.

BACKGROUND OF THE INVENTION

Spread spectrum modulation refers to any modulation scheme that produces a spectrum for the transmitted signal much wider than the bandwidth of the information being transmitted independently of the information-bearing signal. Spread spectrum modulation has recently been used in digital cellular communication systems, such as the digital cellular communications systems that comply with Telecommunications Industry Association (TIA) Interim Standard (IS) 95.

The IS-95 system has been designed to replace a number of existing analog cellular radio channels with a single direct sequence CDMA carrier. Asymmetric modulation methods have been employed in the forward link (base-to-mobile) and the reverse link (mobile-to-base), although both links are spread at a 1.2288-Mchips/s rate, thereby permitting both links to occupy the same bandwidth. The forward link employs coherent modulation/demodulation. The reverse link employs non-coherent modulation/demodulation.

In the mobile transmitter of the reverse link, the speech coder output is supplied to a rate-$\frac{1}{3}$ constraint-length-9 convolutional encoder. The output of the convolutional encoder is then applied to a 32×18 block interleaver of length 576 symbols. The coded, interleaved symbols are then block coded using a 64-ary orthogonal modulator.

At the output of the 64-ary modulation process, the symbol rate is 28.8 ksym/s×64/6=307.2 k-Walsh Chips/s. The coded symbol stream is then spread and scrambled by mixing a masked 1.2288-Mchips/s long code (period $2^{42}-1$) from a long-code generator. This masked long code may also be referred to as a user code or subscriber code because it differentiates the signal of one from another. This data stream is spread further by simultaneously spreading the data stream in quadature with two short-length (period $2^{15}$) sequences. The resulting quadature channels are then applied to an offset-QPSK modulator for I/Q filtering and for mixing up to the output carrier frequency.

At the base station, the received signal is initially despread with the quadature length $2^{15}$ PN sequences. The resulting signal is then further despread/descrambled with the long user code before being applied to a 64-ary correlator. In the prior art, traditional IS-95 Rake demodulators despread signal data serially, as each signal sample is received. Therefore, prior art Rake demodulators require at least one complete demodulator circuit for each user, and preferably additional demodulators for demodulating fingers, or multipath signals, from each user. A finger may be referred to as a copy of the CDMA signal, which is usually received later in time because of the propagation delay traveling over a longer path.

In addition to duplicating demodulator circuitry, the throughput of the serial despreading architecture is limited by the incoming data rate, which is typically fixed and cannot be increased in order to increase throughput. Therefore, it would be desirable to have a new demodulation architecture that allowed the despread circuitry to operate at a rate faster than the incoming data rate, which increases data throughput.

Figure 1:
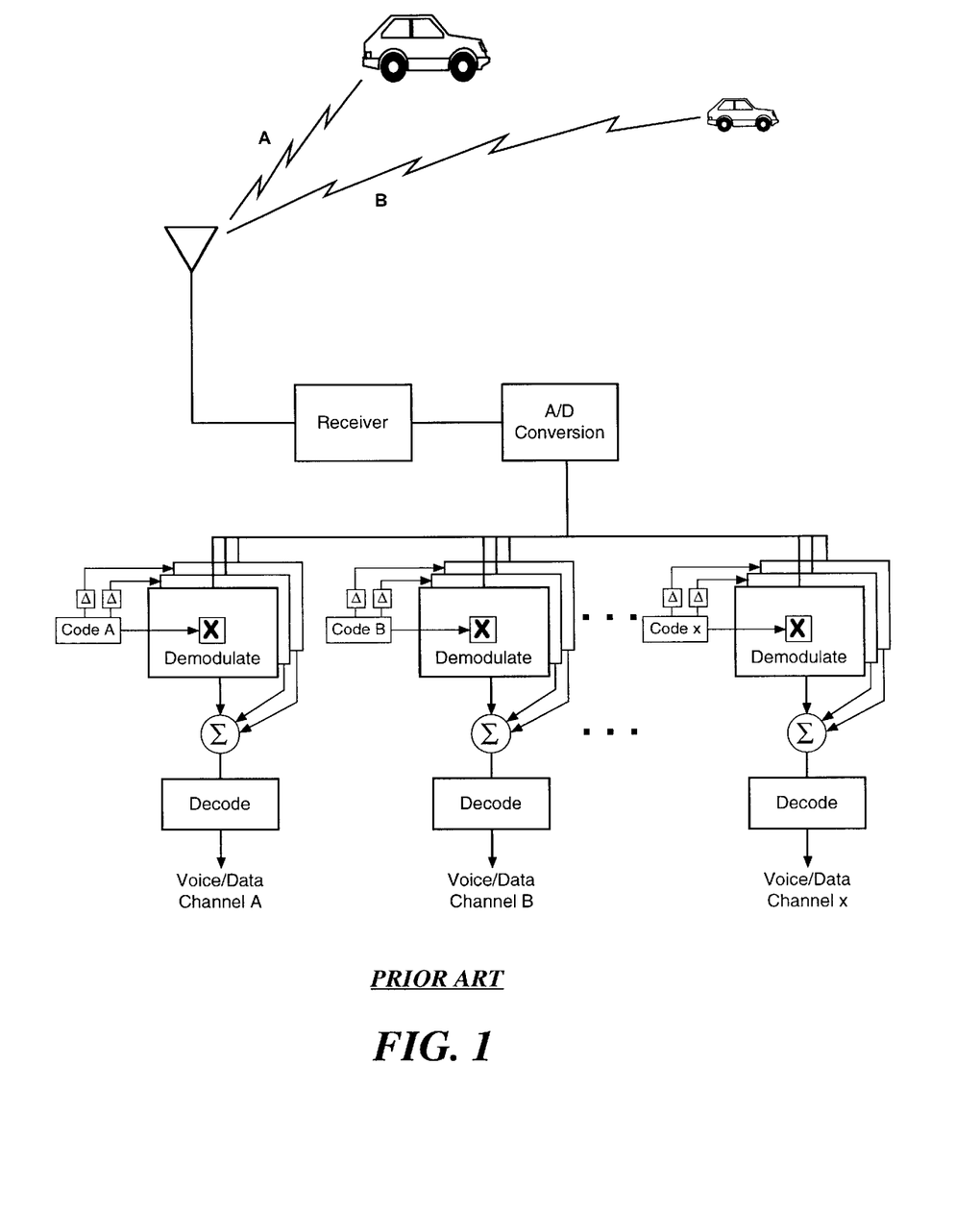
FIG. 1 depicts a digital communication system having code division multiple access (CDMA) demodulators and decoders according to the prior art.

As shown in FIG. 1 and mentioned above, this serial CDMA demodulation architecture requires many copies of the demodulator and decoder circuits in order to demodulate signals from multiple system users. As depicted, digital wireless communications system 20 receives CDMA signals from subscribers 22 and 24. Subscriber 22 transmits signal A and subscriber 24 transmits signal B, both of which are received by antenna 26. Subscriber 22 is depicted closer to antenna 26 than subscriber 24. This means that a frame, or group of symbols, in signal A arrives at antenna 26 sooner than a frame transmitted from subscriber 24. Moreover, signal A and signal B may overlap in time.

From antenna 26, the radio frequency signals are coupled to receiver 28, which removes the radio frequency carrier from signals A and B.

The output of receiver 28 is then converted from an analog signal to a digital signal by A/D converter 30. The digital data stream output from A/D converter 30 includes the information contained in both signal A and signal B, which are separated from one another by different user codes.

In a typical IS-95 system, A/D converter 30 uses a 4-bit output to represent a range of values in offset 2's compliment form. Also, typical IS-95 systems use dual A/D converters 30—one for an I channel and one for a Q channel. Demodulators 32 use selected user codes to separate the CDMA signals from each other, and decoders 38 decode the encoded symbols to recover subscriber data.

In the prior art, demodulators 32 multiply the output samples of A/D converter 30 by a precisely synchronized replica of the user code 34 which was originally used to spread the subscriber's data. This multiplication of the incoming samples by a user code is done serially, signal sample-by-signal sample, to produce despread samples which represent a despread signal.

To support diversity reception, or reception of multipath signals, each user may be allocated several demodulators 32 in order to recover all received signal energy from a particular subscriber. In the prior art, four demodulator circuits are allocated to each subscriber to form a 4-branch, or 4-finger, Rake receiver at the base station of the digital cellular system. In FIG. 1, multiple demodulator circuits are shown, each receiving a user code or a delayed copy of the user code, and each having an output coupled to a summer 36 which adds together the energy demodulated in each finger of the Rake receiver. The outputs of the summers 36 are coupled to decoders 38 which decode encoded symbols from summers 36 to produce user voice samples or user data. Decoder 38 may be implemented by a convolutional decoder, such as a Viterbi decoder.

Thus, one disadvantage in the prior art is the large number of duplicated circuitry required to provide the multi-finger Rake receiver for each subscriber. Another disadvantage in the prior art is that fingers of the Rake receiver are permanently allocated to a particular subscriber. Therefore, if one subscriber requires more than the fixed number of fingers and another subscriber does not need all of its allocated fingers, surplus fingers from one subscriber may not be allocated to another subscriber needing additional fingers.

Therefore, a need exists for an improved method and system for demodulating a code division multiple access signal which permits reallocation of demodulation resources and reduces the circuitry required to demodulate CDMA from one or more subscribers.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 2:
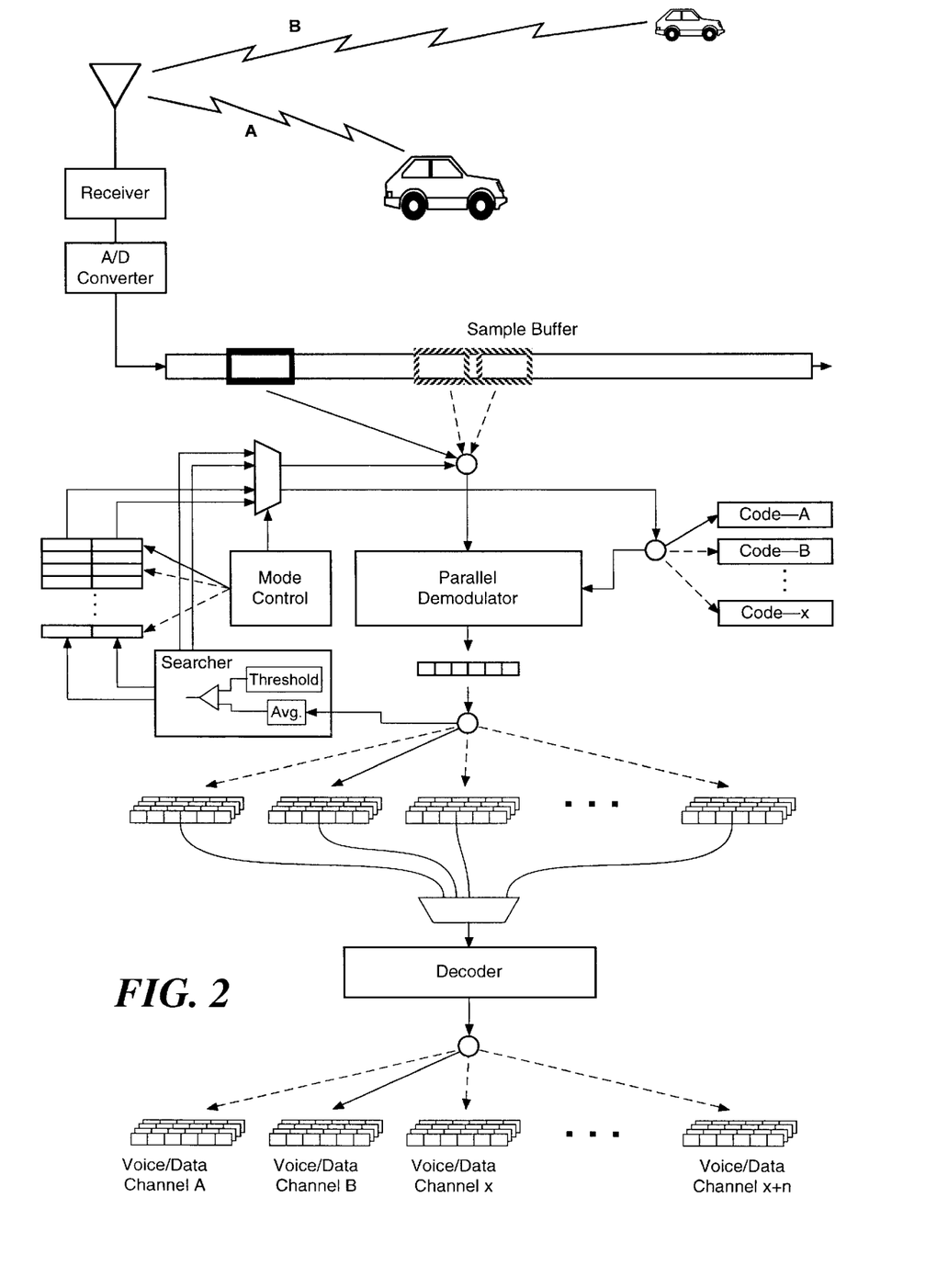
FIG. 2 is a high-level block diagram illustrating the CDMA demodulator/decoder architecture in accordance with the method and system of the present invention.

With reference now to the figures, and in particular with reference to FIG. 2, there is depicted portions of a digital wireless communication system in accordance with the present invention. As is shown, subscribers 22 and 24 transmit CDMA signals A and B, respectively, which are received by antenna 26. In a direct sequence code division multiple access system, signals A and B are simultaneously transmitted on the same frequency, and the information carried by signals A and B are separated by a user code which is used to spread the information at the transmitters.

CDMA signals A and B each contain groups of symbols that make up a frame of data. Frames of data in signals A and B arrive at antenna 26 at the same rate, but may not arrive in phase with one another. As shown in FIG. 2, subscriber 22 may be closer to antenna 26 than subscriber 24, which may or may not cause Walsh symbol boundaries in signals A and B to overlap.

Radio frequency signals from antenna 26 are coupled to receiver 28, which removes the radio frequency carrier from the composite CDMA signal to form an analog baseband signal.

Next, analog to digital (A/D) converter 30 samples the analog baseband signal and outputs a digital baseband signal which is then stored in sample buffer 52. In a preferred embodiment, such as in an IS-95 digital cellular communication system, A/D converter 30 is preferably capable of converting analog baseband data to digital baseband data at a rate in excess of the chip rate of 1.228 Mchips/s. Preferably, the analog baseband signal is oversampled, perhaps by as much as eight times. The samples produced by A/D converter 30 may also represent a complex data stream consisting of I and Q components. In one embodiment, the I and Q components may be stored in as upper and lower nibbles of an 8-bit word. Note that any selected group of samples stored in sample buffer 52 may carry information belonging to more than one user.

With regard to the size of sample buffer 52, sample buffer 52 is preferably large enough to store a number of samples from A/D converter 30 that represent at least one Walsh symbol. If a larger sample buffer 52 having space to store samples representing say three Walsh symbols is used, different users having a round trip delay equal to two Walsh symbol periods may be accommodated in the same sample buffer. Accommodating the delay of two Walsh symbols implies a very large cell area. If smaller cells are used, sample buffer 52 maybe smaller. A sample buffer large enough to store more than three Walsh symbols worth of samples allows double buffering techniques to be used for storing a next group of CDMA signal samples while a previous group of samples is being demodulated.

After digital baseband samples are stored in sample buffer 52, addressing means 54 addresses or selects a range of samples that represent a plurality of chips from a particular user. Addressing means 54 recalls such a range of samples beginning at any sample in sample buffer 52. That is, addressing means 54 is not constrained by symbol or frame boundaries.

The output of addressing means 54 is coupled to parallel demodulator 56. Parallel demodulator 56 receives a range of samples and despreads the range of samples in a parallel operation to produce a plurality of despread samples. The despread samples are then integrated in a parallel operation to produce at least a portion of a Walsh symbol.

In a preferred embodiment, parallel demodulator 56 is used to implement two modes of operation—a search mode and a user demodulation mode. The selection of the operating mode is controlled by mode control 58. When in a user demodulation mode, mode control 58 may schedule the demodulation of the signals from multiple users. In other words, mode control 58 determines what demodulation task the parallel demodulator performs.

Mode control 58 controls address multiplexer 60, which selects both a buffer address and user code selection data from either searcher 62 or user list 64. A buffer address output from address multiplexer 60 is coupled to addressing means 54 for providing a sample buffer address. User code selection output data from address multiplexer 60 is coupled to code selector 66 for selecting one of a plurality of user codes 68.

Searcher 62 is used to scan sample buffer 52 to locate a coded user channel. Therefore, searcher 62 provides both a buffer address and user code selection data to addressing means 54 and code selector 66, respectively, when mode control 58 is set to a search mode. In order to find a coded user channel, searcher 62 receives input from parallel demodulator 56. Such an input is averaged over a period of time, or over a number of Walsh symbols, and compared with an energy threshold level to determine whether or not a user's CDMA signal, which is spread with a particular user code, is present at the particular address or offset in the sample buffer, and correlates with the selected user code.

When searcher 62 has determined that a user signal is present, searcher 62 outputs both a buffer address 70 and user code selection data 72, which are stored in user list 64. Therefore, user list 64 stores buffer addresses and user code selection data for multiple system users. Additionally, user list 64 may be used to store buffer addresses 70 and user code selection data 72 for multiple fingers for each system user. Note that for the same user, each finger uses the same user code selection data, while each finger has a different offset or buffer address. In an IS-95 system, the user code selection data may be a long code mask used to mask the long code generator. In an alternate embodiment, the user code selection data may be actual code bits.

According to an important aspect of the present invention, fingers for each subscriber may be dynamically allocated and reallocated according to the number of fingers needed by each subscriber by managing the data entries in user list 64. In contrast, many prior art embodiments use a fixed number of fingers per subscriber. The number of entries in user list 64 is limited by the ability of parallel demodulator 56 to keep up with the new samples being loaded into sample buffer 52 and the need to share demodulator cycles with searcher 62. Managing data entries in user list 64 may be referred to as allocating demodulation resources, where the resource is a number of demodulator cycles per second, or an equivalent measure of a proportion of the demodulator bandwidth.

In the user data demodulation mode, the output of demodulator 56 is selectively routed to user frame buffers 74 by symbol router 76. User frame buffers 74 collect an entire 20 ms frame of symbols, and may be used to deinterleave symbols in an IS-95 system. Note that the number of symbols in frame buffer 74 is determined in part by the type of decoder selected.

Decoder 78 receives deinterleaved symbols from the user frame buffers 74 via frame multiplexer 80. Decoder 78 may be implemented with a soft-decision Viterbi decoder. Note that a single decoder 78 may be shared by multiple users in this architecture, and frame multiplexer 80 schedules the use of this decoder resource. Data output by decoder 78 is then routed to output buffers 82 via router 84. Data in output buffers 82 may represent user data such as computer readable data, or encoded voice data which may be converted to audible speech by a speech decoder.

The Viterbi decoding algorithm was discovered and analyzed by Viterbi in 1967 in an article entitled "Error Bounds for Convolutional Codes and an Asymptotically Optimum Decoding Algorithm," *IEEE Transactions on Information Theory*, Vol. IT13, April 1967, pp. 260–269. The algorithm involves calculating a measure of similarity, or distance, between the received signal, at time $t_i$, and all of the trellis paths entering each state at time $t_i$. The Viterbi algorithm removes from consideration those trellis paths that cannot possibly be candidates for the maximum likelihood choice. When two paths enter the same state, the one having the best metric is chosen; this path is called the surviving path. Note that the goal of selecting the optimum path can be expressed equivalently, as choosing the code word with the maximum likelihood metric, or as choosing the code word with the minimum distance metric.

Although FIG. 2 illustrates an embodiment of the invention used to implement an IS-95 digital wireless communication system, those persons skilled in the art should recognize that parallel demodulator 56 may directly output user voice or data bits, in which case router 76 would send user data directly to output buffers 82 rather than use frame buffers 74 to buffer data for decoder 78. In other words, decoder 78 is not required in some embodiments of the present invention.

Figure 3:
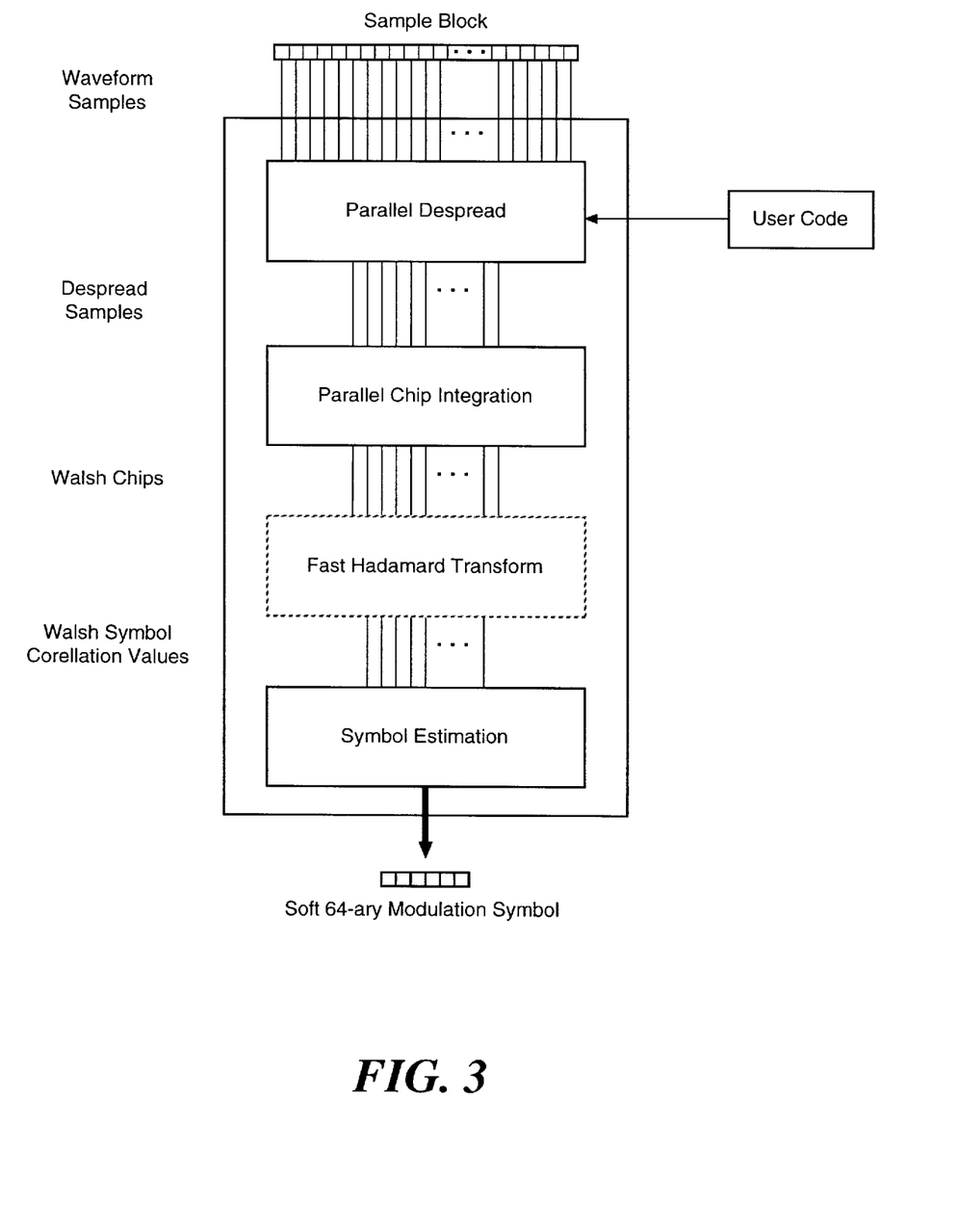
FIG. 3 is a more detailed block diagram of the CDMA parallel demodulator in accordance with the method and system of the present invention.

With reference now to FIG. 3, there is depicted a block diagram of parallel demodulator 56, which is shown in FIG. 2, according to the method and system of the present invention. As shown, parallel demodulator 56 includes parallel despreader 100, which receives a block of samples 102 and a block of user code 104 as inputs and produces despread samples. Sample block 102 includes a number of signal samples that represent multiple chips in a digital baseband CDMA signal from a particular user.

According to an important aspect of the present invention, parallel despreader 100 despreads, in parallel, a number of samples that represent more than one chip for a particular user. In one embodiment of the present invention, a number of signal samples that represent one Walsh symbol from one user may be despread in parallel. In other embodiments, parallel despreader 100 may be used to despread a number of chips that represent a portion, say one eighth, of a Walsh symbol from one user. If only a portion of a symbol is despread in parallel, multiple parallel despreading operations are used to despread a complete Walsh symbol. If a portion of a symbol is despread, a corresponding portion of user code 104 is used during each sequential despreading operation.

After parallel despreader 100 produces despread samples, such despread samples are input into parallel chip integrator 106. Parallel chip integrator 106 sums energy from each despread sample to produce multiple Walsh chips of a Walsh symbol as an output. In an IS-95 system, there are 64 Walsh chips in a Walsh symbol.

In a non-M-ary embodiment of the present invention, the output of parallel chip integrator 106 may be a symbol.

To convert the Walsh chips into a Walsh symbol, Walsh chips from parallel integrator 106 are transferred into an optional fast Hadamard transform (FHT) 108. For more information regarding the implementation of a fast Hadamard transform, see Chapter 9 of *Introduction to Spread Spectrum Communications*, published by Prentice Hall, 1995.

Coupled to the output of the optional fast Hadamard transform 108 is symbol estimator 110. The function of symbol estimator 110 is to estimate or decide which one of the 64 Walsh symbols was actually transmitted by the subscriber and output soft 64-ary modulation symbol 112, which in an IS-95 system is 6 encoded symbols. Symbol estimator 110 and FHT 108 are required only with M-ary modulation systems.

Figure 4:
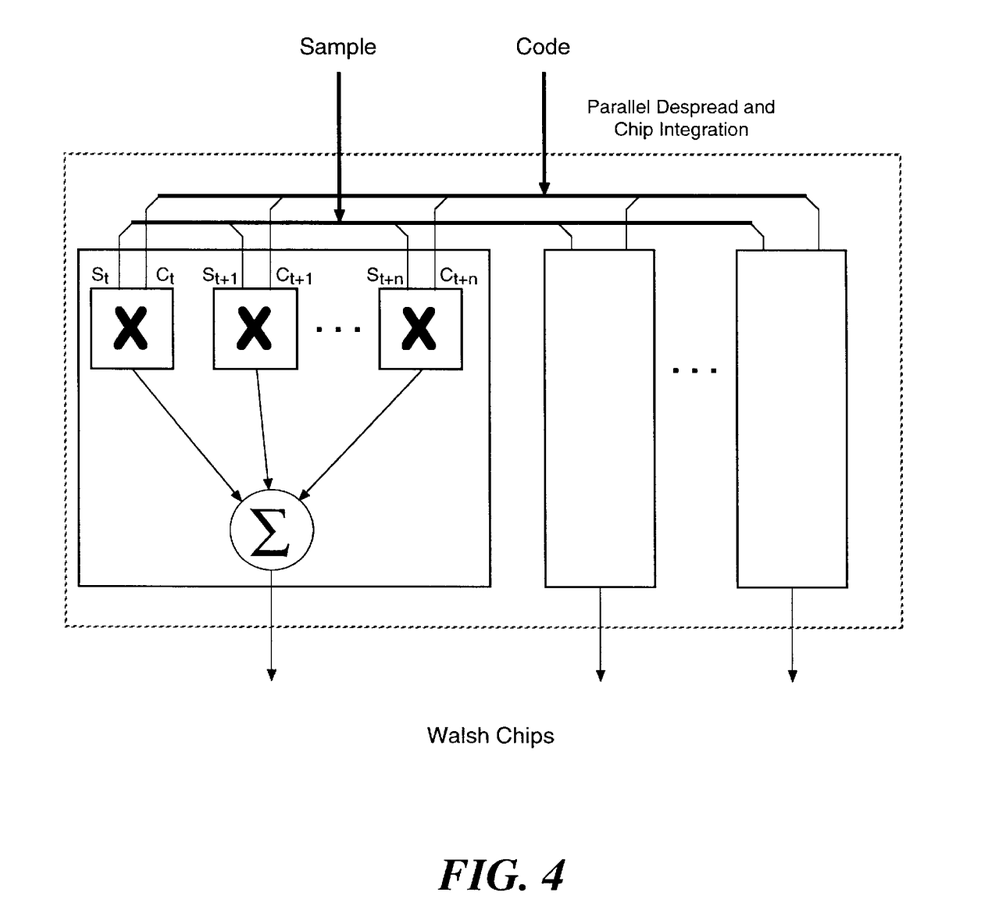
FIG. 4 is a more detailed blocked diagram of a parallel despread and chip integration function in accordance with the method and system of the present invention.

With reference now to FIG. 4, there is depicted a more detailed block diagram of the parallel despreading and chip integration function of the method and system of the present invention. Parallel despreader and chip integrator 120 includes the functions of both parallel despreader 100 and parallel chip integrator 106 in FIG. 3. As illustrated, parallel despreader and chip integrator 120 includes a plurality of multipliers 122 coupled to a chip integrator 124 in each despreader/integrator cell 126. Parallel despreader and chip integrator 120 may include 64 despreader/integrator cells 126 in order to despread and integrate, in a parallel operation, 64 Walsh chips which constitute and entire Walsh symbol for a particular user in an IS-95 system. Alternatively, other embodiments of the present invention may use less than 64 despreader/integrator cells 126, in which case portions of sample block 102 are sequentially selected and input into parallel despreader and chip integrator 120.

In a non-M-ary system, a single despreader/integrator cell 126 may be used with many multipliers 122 feeding a chip integrator 124. The ratio of multipliers 122 to chip integrators 124 is determined by the ratio of the PN spreading rate to the incoming symbol rate.

Whether an entire Walsh symbol is despread and integrated, or whether some smaller portion of a Walsh symbol is sequentially despread and integrated, the present invention uses a plurality of multipliers 122 and chip integrators 124 operating in parallel in order to despread and integrate Walsh chips. Multipliers 122 multiply one sample value $S_t$ by +1 or −1 according to code bit $C_t$. Integrator 124 adds all the signed values output by multipliers 122 to produce a Walsh chip. Integrator 124 and multipliers 122 may perform complex operations, as in an IS-95 embodiment of the present invention.

In the prior art, Walsh chips are despread and integrated serially such that the results of a despreading and integrating operation are determined one Walsh chip at a time. In contrast the present invention despreads and integrates multiple Walsh chips simultaneously, as shown by the outputs of parallel despreader and chip integrator in FIG. 4.

Figure 5:
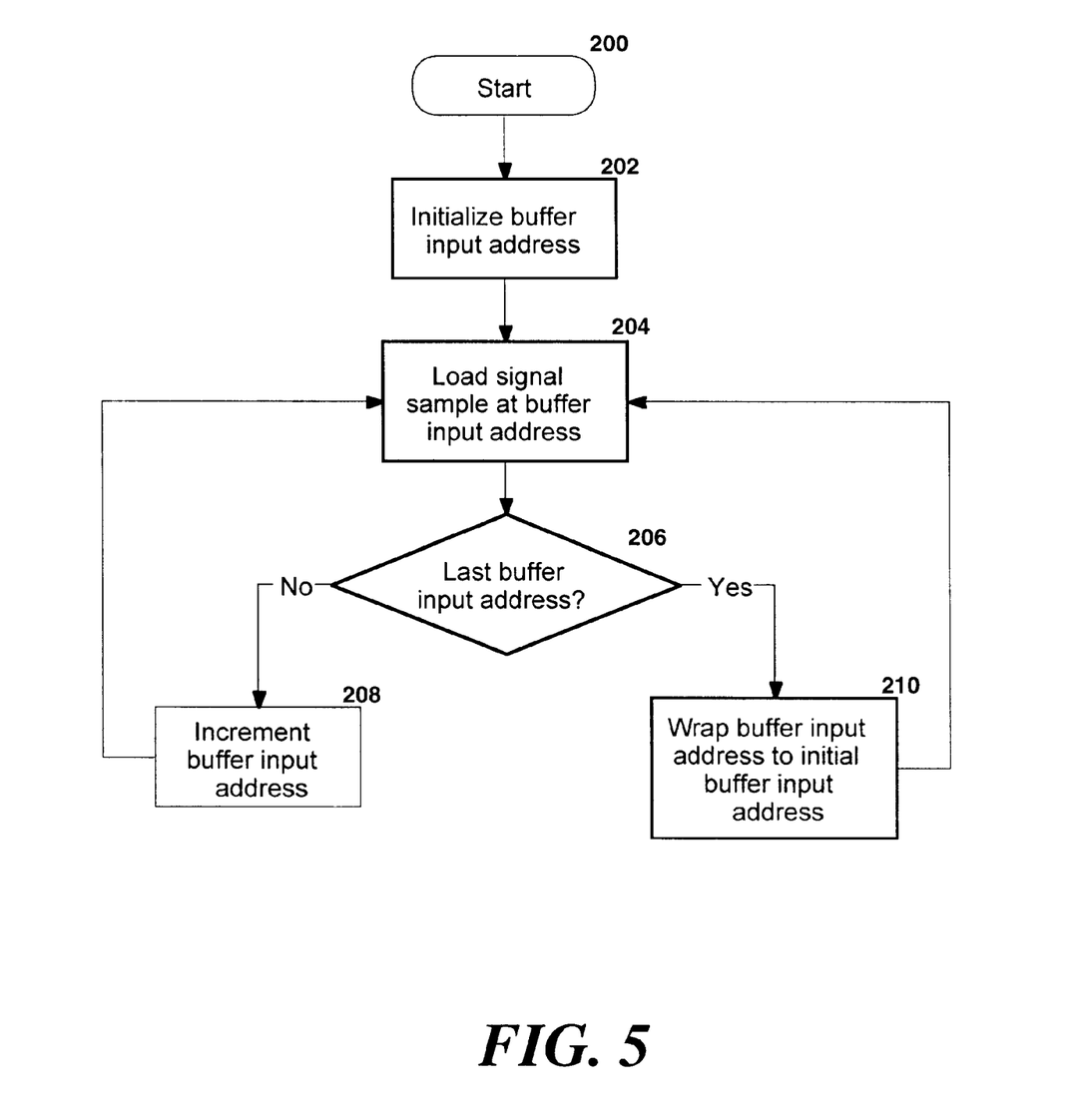
FIG. 5 is a high-level logic flow chart which illustrates the process of loading a sample buffer with signal samples in accordance with the method and system of the present invention.

With reference now to FIG. 5, there is depicted a high-level logical flow chart of the process of filling a sample buffer with samples of a CDMA signal in accordance with the method and system of the present invention. As illustrated, the process begins at block 200 and thereafter passes to block 202 wherein the sample buffer input address is initialized. Thereafter, the process loads a signal sample at the current sample buffer input address, as illustrated at block 204. Thus, with reference again to FIG. 2, a sample from A/D converter 30 is loaded into sample buffer 52 at the buffer input address.

Next, the process determines whether or not the current buffer address is the last buffer input address, as depicted at block 206. If the current buffer address is not the last buffer address, the buffer input address is incremented, as illustrated at block 208. Alternatively, if the current buffer address is the last buffer input address, the buffer input address is wrapped around to the initial buffer input address, as depicted at block 210. After a new buffer address has been calculated at either block 208 or 210, the process iteratively loops to block 204 wherein the next signal sample is loaded at the new buffer input address.

In this description, the term buffer address is used in a broad sense. A buffer address may include more than just an address word composed of zero and one bits. Because the sample buffer stores a finite number of digital baseband sample values, and because these values are continuously being loaded and unloaded from sample buffer 52, the term "buffer address" is intended to include data necessary to describe the location for either loading or unloading sample values. In some embodiments of the present invention, sample buffer 52 may be implemented with a rotatable shift register, in which case buffer address may refer to a number of shifts necessary to load or unload sample values. In other embodiments of the present invention, sample buffer 52 may be accessed through a network of multiplexers, in which case a buffer address may refer to a configuration for such a multiplexer network.

Figure 6:
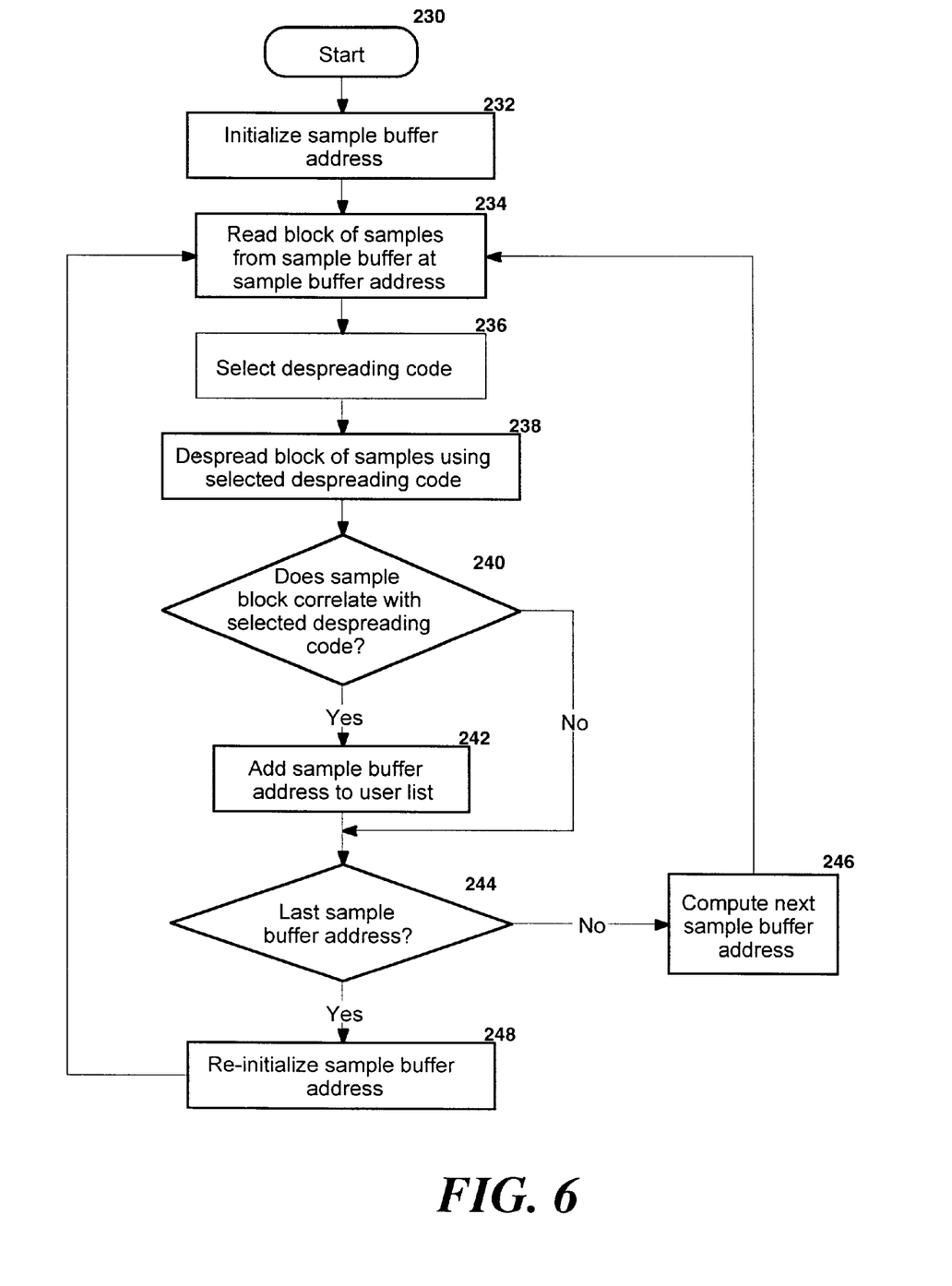
FIG. 6 is a high-level logic flow chart depicting the process of searching for a user signal in accordance with the method of the present invention.

With reference to FIG. 6, there is depicted a process of searching a sample buffer for a CDMA signal in accordance with the method and system of the present invention. As illustrated, the process begins at block 230 and thereafter passes to block 232 wherein the sample buffer address is initialized. Typically, the sample buffer address is initialized to the address of the earliest sample in the sample buffer. Next, the process reads a block of samples from the sample buffer at the current sample buffer address, as illustrated at block 234. In one embodiment of the present invention, a block of samples includes all samples necessary to despread and integrate an entire Walsh symbol. However, smaller blocks of samples may be read from sample buffer 52 and processed serially.

After reading a block of samples, the process selects a despreading code, as depicted at block 236. When the method and system of the present invention is performing a search for a new user, the selected despreading code is typically the despreading code used for the access channel according to the IS-95 system specification. Searching operations may continue once a user has been found in order to locate fingers, or multipath signals, from that user.

Next, the process demodulates the block of samples using the selected despreading code, as illustrated at block 238. This demodulation process occurs as illustrated and described with reference to FIGS. 3 and 4 above. After demodulating, the process determines whether or not the sample block correlates with the selected despreading code, as depicted at block 240. If the sample block does correlate with the selected despreading code, the correlation may be detected by comparing the magnitude of the received energy with a predetermined threshold.

Once correlation is detected, the process adds user data, which may include the sample buffer address and user code selection data, to a user list, as illustrated at block 242. This information stored in the user list includes information necessary to calculate the next sample block address and the user code selection data necessary to generate a despreading code for the CDMA signal of the newly located user. Additionally, each user may have data entered in the user list that identifies multiple fingers. According to an important aspect of the present invention, some users may have data in the list for one or two fingers, while other users may have data in the list for four or more fingers, depending upon the user's needs and efficient allocation of demodulator resources. Thus, the number of fingers allocated to each user may be dynamically allocated and reallocated as the signal from each particular user changes and fades. In contrast with the prior art, the present invention is not limited by a maximum or minimum preset number of fingers allocated to each user's signal.

With reference again to block 240, if the sample block does not correlate with the selected despreading code, nothing is entered into the user list, and the process determines whether or not the current sample is the last sample buffer address as depicted at block 244.

If the current address is not the last sample buffer address, the process computes the next sample buffer address, as illustrated at block 246. When computing the next sample buffer address, the address may be incremented by one sample or by a predetermined number of samples, in which case the sample buffer may be searched faster, but perhaps not as accurately.

If, at block 244, the process determines that the present address is the last sample buffer address, the process reinitializes the sample buffer address to begin searching at the beginning of the sample buffer, as depicted at block 248. After calculating a new sample buffer address at either block 246 or 248, the process iteratively returns to block 234, wherein a new block of samples is read from the new sample buffer address. In this manner, the process continuously searches for new CDMA signals and new fingers for already located CDMA signals.

Figure 7:
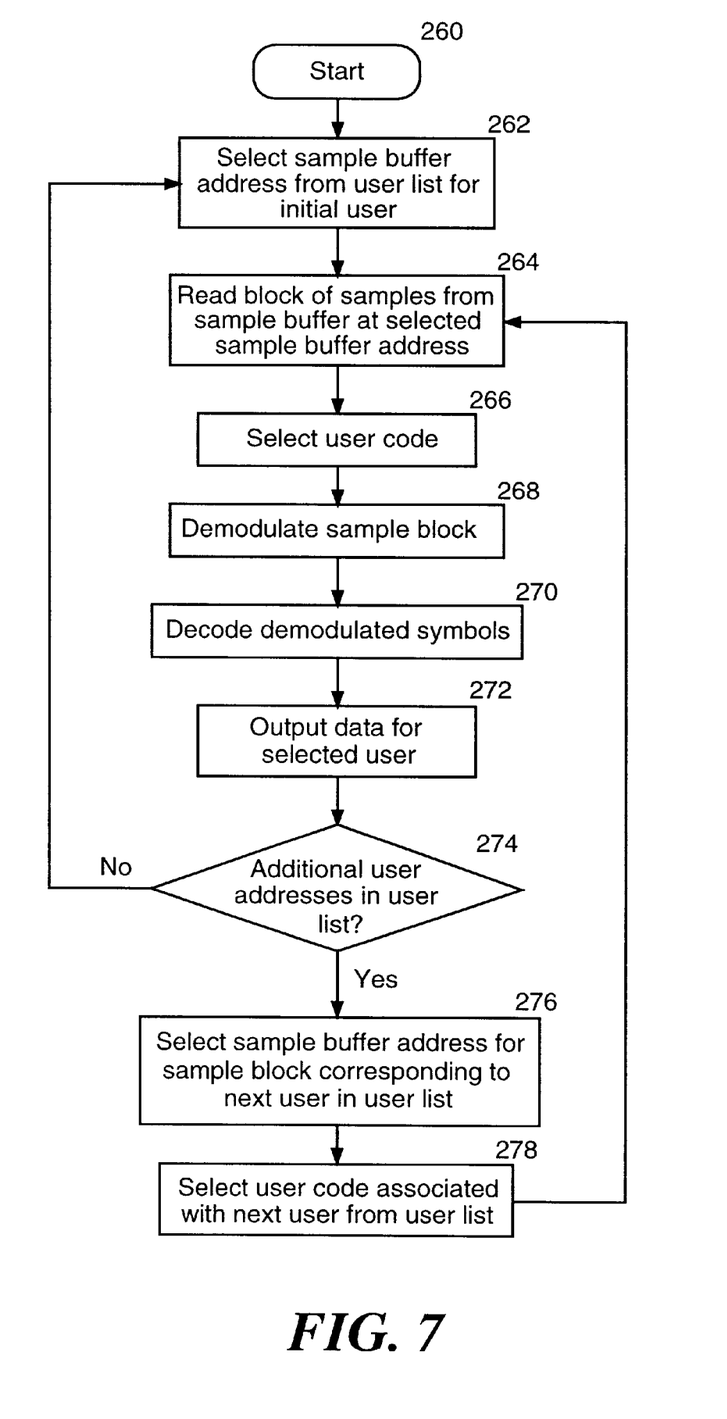
FIG. 7 is a high-level logic flow chart which illustrates the method and system for demodulating and decoding a user signal in accordance with the method and system of the present invention.

With reference now to FIG. 7, there is depicted the process of demodulating and decoding a sample block in accordance with a method and system of the present invention. As illustrated, the process begins at block 260 and thereafter passes to block 262 wherein a sample buffer address is selected from the user list for an initial user. Next, the process reads a block of samples from the sample buffer at the selected sample buffer address, as illustrated at block 264. The block of samples read may include a number of samples that represents an entire Walsh symbol if the invention is used in an IS-95 CDMA system.

Thereafter, the process selects a user code associated with the current user in the user list, as depicted at block 266. This step may be implemented by using user code selection data in user list 64 and code selector 66 to select one of the plurality of user codes 68, as illustrated in FIG. 2.

Next, the process demodulates the sample block, as illustrated at block 268. This demodulation step includes despreading and integrating sample chips to produce Walsh chips, which in an IS-95 system are then processed through an FHT to produce 64 soft Walsh modulation symbols. Furthermore, one of the 64 modulation symbols is estimated as being the symbol that was transmitted.

Next, the process decodes the demodulated soft symbols, as depicted at block 270. In one embodiment, this can be implemented with a fully parallelized Viterbi decode. After the symbols are decoded, the process outputs the data for the selected user, as illustrated at block 272. The output data may take the form of sampled voice data or computer readable data.

After outputting the data for the selected user, the process determines whether or not additional users are listed in the user list, as depicted at block 274. If additional users are listed in the user list, the process selects the sample buffer address for the sample block corresponding to the next user in the list and selects the corresponding user code, as illustrated at block 276. If no additional users are listed in the user list, the process loops to block 262 wherein the initial user is reselected for demodulating the next sample block for the initial user.

As may be seen by comparing FIG. 1 with FIG. 2, the demodulation architecture of the present invention eliminates multiple copies of both a demodulator circuit and a decoder circuit. The parallel demodulator circuit of the present invention is used to demodulate multiple CDMA signals from multiple system users. This is accomplished by dynamically allocating and scheduling demodulation resources (parallel demodulator cycles per second) between the needs of a search engine and multiple users with multiple fingers.

Because the architecture of the present invention buffers incoming samples, the demodulating operation may operate at clock speeds that exceed the incoming chip. Operating at this higher clock speed greatly improves the demodulator throughput.

Although the present invention is illustrated and described with reference to an IS-95 reverse link, the operating principles of the present invention may be applied in any direct sequence CDMA system.

Using a single parallel demodulator and a single decoder provides a gate efficient design for demodulating CDMA signals from multiple users. The architecture of the present invention is ideally suited for demodulating and decoding signals from all users in one or more sectors within a single integrated circuit.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of demodulating a code division multiple access (CDMA) signal for multiple users in a communication system:

storing samples of said CDMA signal in a sample buffer, wherein said CDMA signal includes signals from multiple users, and wherein a number of samples stored represents complete corresponding symbols in a selected frame from each of the multiple users;

recalling a first plurality of said samples from said sample buffer that represent a plurality of chips in a signal from a first one of said multiple users;

demodulating said first plurality of said samples using a first user code to produce at least a portion of a first user's symbol in said code division multiple access signal;

recalling a second plurality of said samples from said sample buffer that represent a plurality of chips in a signal from a second one of said multiple users; and demodulating said second plurality of said samples using a second user code to produce at least a portion of a second user's symbol in said code division multiple access signal.

2. The method of demodulating a code division multiple access signal for multiple users according to claim 1 wherein said demodulating steps include the steps of:

despreading said first plurality of said samples using said first user code to produce a first plurality of despread samples;

integrating said first plurality of despread samples to produce said at least a portion of a first user's symbol;

despreading said second plurality of said samples using said second user code to produce a second plurality of despread samples; and integrating said second plurality of despread samples to produce said at least a portion of a second user's symbol.

3. The method of demodulating a code division multiple access signal for multiple users according to claim 2 wherein said despreading steps each include simultaneously multiplying each sample in said range of said samples by +1 or −1 according to a corresponding portion of said first or second user code.

4. The method of demodulating a code division multiple access signal for multiple users according to claim 1 further including the steps of performing a first decoding operation on said first user's symbol and performing a second decoding operation on said second user's symbol.

5. The method of demodulating a code division multiple access signal for multiple users according to claim 4 wherein said steps of performing decoding operations include performing convolutional decoding operations.

6. The method of demodulating a code division multiple access signal for multiple users according to claim 1 further including the steps of searching said sample buffer for said first plurality of samples of said CDMA signals that correlate with said first user code and searching said sample buffer for said second plurality of samples of said CDMA signal that correlate with said second user code.

7. The method of demodulating a code division multiple access signal for multiple users according to claim 6 further including recording information in a user list that is needed to recall a next first plurality of said samples from said sample buffer that represent at least a portion of a next first user's symbol in said CDMA signal.

8. The method of demodulating a code division multiple access signal for multiple users according to claim 6 wherein said searching step further includes searching said sample buffer for a plurality of samples that represent an additional copy of a signal from the first one of said multiple users.

9. The method of demodulating a code division multiple access signal for multiple users according to claim 8 further including the step of recording information in a user list that is needed to recall a next plurality of samples from said sample buffer that represent at least a portion of a next symbol in said additional copy of said signal from the first one of said multiple users.

10. The method of demodulating a code division multiple access signal for multiple users according to claim 8 wherein a number of demodulation cycles per second is a demodulation resource, and wherein said signals from said multiple users require various quantities of demodulation resources, further including the step of allocating demodulation resources between said multiple users based upon available resources and needs of said multiple users to demodulate a variable number of fingers of said CDMA signal per user.

11. The method of demodulating a code division multiple access signal for multiple users according to claim 1 wherein the step storing samples further includes storing, in said sample buffer, a number of samples that represent a symbol in said CDMA signal.

12. A system for demodulating a of code division multiple access (CDMA) signal for multiple users in a communication system comprising:
    means for storing samples of said CDMA signal in a sample buffer, wherein said CDMA signal includes signals from multiple users, and wherein a number of samples stored represents complete corresponding symbols in a selected frame from each of the multiple users;
    means for recalling a first plurality of said samples from said sample buffer that represent a plurality of chips in a signal from a first one of said multiple users;
    means for demodulating said first plurality of said samples using a first user code to produce at least a portion of a first user's symbol in said code division multiple access signal;
    means for recalling a second plurality of said samples from said sample buffer that represent a plurality of chips in a signal from a second one of said multiple users; and
    means for demodulating said second plurality of said samples using a second user code to produce at least a portion of a second user's symbol in said code division multiple access signal.

13. The system for demodulating a code division multiple access signal for multiple users according to claim 12 wherein said demodulating step includes the steps of:
    means for despreading said first plurality of said samples using said first user code to produce a first plurality of despread samples;
    means for integrating said first plurality of despread samples to produce said at least a portion of a first user's symbol;
    means for despreading said second plurality of said samples using said second user code to produce a second plurality of despread samples; and
    means for integrating said second plurality of despread samples to produce said at least a portion of a second user's symbol.

14. The system for demodulating a code division multiple access signal for multiple users according to claim 13 wherein said means for despreading each include means for simultaneously multiplying each sample in said range of said samples by +1 or −1 according to a corresponding portion of said first or second user code.

15. The system for demodulating a code division multiple access signal for multiple users according to claim 12 further including means for performing decoding operations on said first and second user's symbols.

16. The system for demodulating a code division multiple access signal for multiple users according to claim 15 wherein said means for performing decoding operations includes means for performing convolutional decoding operations.

17. The system for demodulating a code division multiple access signal for multiple users according to claim 12 further including means for searching said sample buffer for said first plurality of samples of said CDMA signal that correlate with said first user code and said second plurality of samples of said CDMA signal that correlate with said second user code.

18. The system for demodulating a code division multiple access signal for multiple users according to claim 17 further including means for recording information in a user list that is needed to recall a next first plurality of said samples from said sample buffer that represent at least a portion of a next first user's symbol in said CDMA signal.

19. The system for demodulating a code division multiple access signal for multiple users according to claim 17 wherein said means for searching further includes means for searching said sample buffer for a plurality of samples that represent an additional copy of a signal from the first one of said multiple users.

20. The system for demodulating a code division multiple access signal for multiple users according to claim 19 further including means for recording information in a user list that is needed to recall a next plurality of said samples from said sample buffer that represent at least a portion of a next symbol in said additional copy of said signal from the first one of said multiple users.

21. The system for demodulating a code division multiple access signal for multiple users according to claim 19 wherein a number of demodulation cycles per second is a demodulation resource, and wherein said signals from said multiple users require various quantities of demodulation resources, further including means for allocating demodulation resources between said multiple users based upon available resources and needs of said multiple users to demodulate a variable number of fingers of said CDMA signal per user.

22. The system for demodulating a code division multiple access signal for multiple users according to claim 12 wherein said means for storing samples further includes means for storing, in said sample buffer, a number of samples that represent a symbol in said CDMA signal.

23. A system for demodulating a code division multiple access (CDMA) signal for multiple users in a communication system comprising:

a sample buffer for storing CDMA signal samples, wherein said CDMA signal includes signals from multiple users, and wherein a number of samples stored represents complete corresponding symbols in a selected frame from each of the multiple users;

addressing means coupled to said sample buffer for selectively recalling a plurality of said CDMA signal samples that represent a plurality of chips of a user's selected signal;

a parallel demodulator coupled to said recalled plurality of said signal samples and a selected user code source, said parallel demodulator comprising;

a plurality of multipliers, each receiving one of said plurality of signal samples and a corresponding portion of a selected user code from said selected user code source; and     an integrator having multiple inputs and an output, wherein each integrator input is coupled to an output of one of said plurality of multipliers and wherein said output provides a portion of a symbol.

24. The system for demodulating a code division multiple access signal for multiple users according to claim 23 further comprising:

a signal searcher having an input coupled to an output of said parallel demodulator; and a user list coupled to an output of said signal searcher for storing user decoding information for said multiple users, wherein information in said user list is selectably coupled to said addressing means.

\* \* \* \* \*